United States Patent [19]
Lambert, Jr.

[11] 3,794,190
[45] Feb. 26, 1974

[54] SLANTED-AUGER SPREADER/UNLOADER FOR FEED STORAGE TANKS

[75] Inventor: Charles F. Lambert, Jr., Louisville, Ky.

[73] Assignee: Clayton & Lambert Manufacturing Company, Bucker, Ky.

[22] Filed: June 2, 1972

[21] Appl. No.: 258,978

[52] U.S. Cl...... 214/17 CA, 214/17 CB, 214/17 DB
[51] Int. Cl......................... B65g 65/32, B65g 65/38
[58] Field of Search....... 214/17 CA, 17 CB, 17 DB

[56] References Cited
UNITED STATES PATENTS

| | | | |
|---|---|---|---|
| 3,297,177 | 1/1967 | Zeiter | 214/17 DB |
| 3,129,828 | 4/1964 | Lusk | 214/17 DB |
| 3,526,328 | 9/1970 | Garret et al. | 214/17 CB |
| 3,524,557 | 8/1970 | Bakker | 214/17 CA |
| 3,138,300 | 6/1964 | Rintala | 214/17 D X |

*Primary Examiner*—Robert G. Sheridan
*Attorney, Agent, or Firm*—Arthur F. Robert

[57] ABSTRACT

A spreader/unloader composed of a ring gear, a rotary sweep unit of the diametric auger type and a hole former, has its diametric auger inclined and connected for rotation in one direction such that, during both filling and emptying, the augers always move the silage into the auger space between them and uphill along that space. With this arrangement, their upper slanted halves or radius sections operate as an "uphill" spreader during filling while their lower slanted halves operate as an "uphill" unloader during emptying.

It also has a hole former comprising: a vertical member depending from the frame along the center axis of the ring gear; cutter chains centered on said member; and motorized means for whirling said cutter chains horizontally. By whirling the cutter chains during the filling operation or between the filling and emptying operations, a center hole of uniform diameter can be formed entirely through the height of the silage column to ready the installation for the unloading or emptying operations.

12 Claims, 13 Drawing Figures

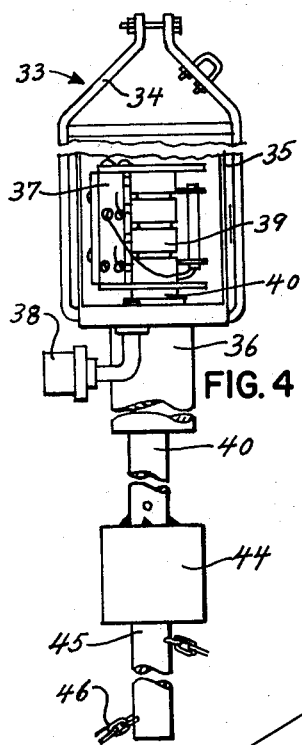
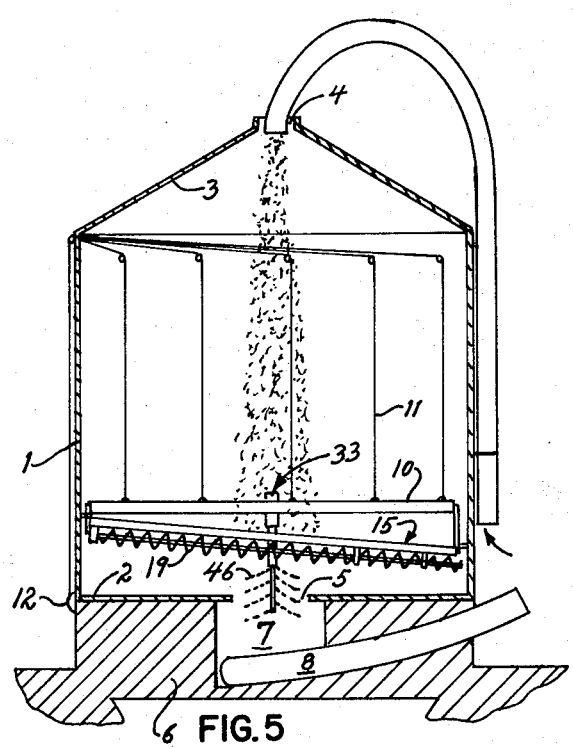
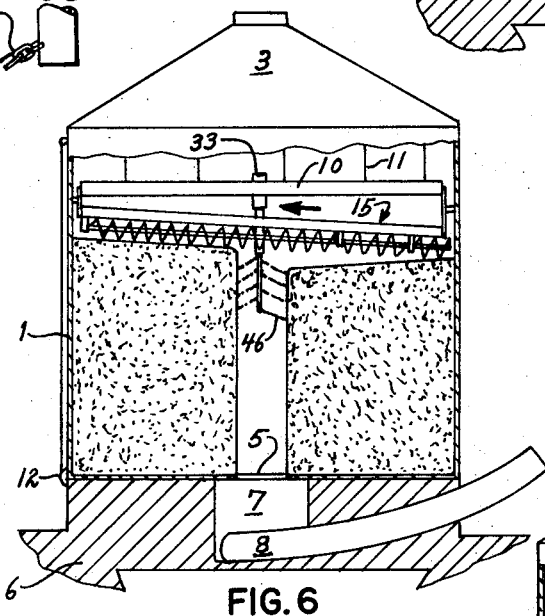
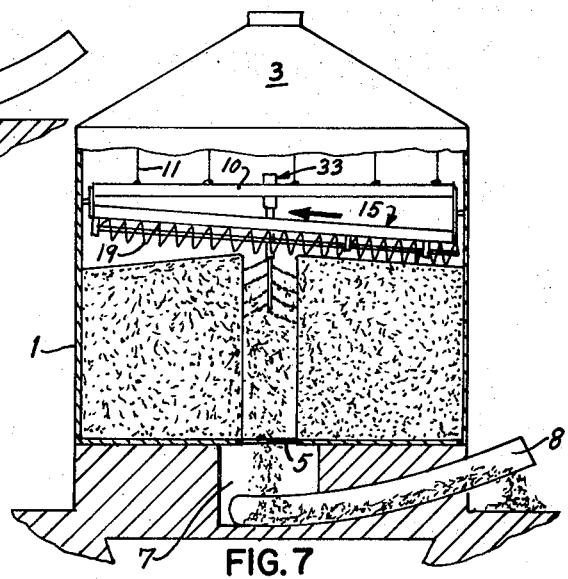
FIG. 4
FIG. 5
FIG. 6
FIG. 7

SLANTED-AUGER SPREADER/UNLOADER FOR FEED STORAGE TANKS

BACKGROUND OF THE INVENTION

1. Field of the Invention

This invention relates to spreader/unloaders which are used in cylindrical feed storage tanks, such as silos and the like, to perform one or more of such operations as: spreading the incoming silage uniformly throughout the cross-sectional area of the tank during tank filling or loading operation; emptying the tank by removing silage from the top of the stored column and directing it out of the tank as and when it is needed for stock-feeding purposes; and cutting a silage discharge hole centrally through a column of silage in the tank.

2. Description of the Prior Art

One successful spreader/unloader device in use today comprises: a non-rotatable ring gear; and a rotary sweep unit (of the double or twin auger type) mounted on the ring gear for tracking rotation about the vertical axis thereof. It also has a holeforming cylinder depending from the device along the axis of the ring gear. The unit has parallel twin right-and-left-hand augers, extending from the center area radially to the wall of the tank. For the filling operation, the twin augers are arranged and rotated one way such that their lower semicircular halves move toward each other so as to move the incoming silage into and along the auger space from the center axis of the silo outwardly toward the outer wall. During filling, the unit carries a cylinder depending along the axis of the tank for discharge-hole-forming purposes. For unloading operations, the depending cylinder must be removed and the augers interchanged and reversely rotated before they function to scrape silage from the top of the silage column into and move that silage inwardly along the auger space until the silage drops into the upper end of said centrally-disposed discharge hole.

SUMMARY OF THE INVENTION

1. Objects of the Invention

The principal objects of the present invention are: to provide a spreader/unloader which is always ready to spread or unload without any interchange of augers and without any change in the direction of auger rotation; and to provide a spreader/unloader which does not require any person to enter the silo during either the filling operation or the emptying operation or therebetween.

2. Statement of the Invention

The more important objects of the present invention are achieved by equipping a spreader/unloader with an upwardly inclined or slanted pair of augers extending diametrically across the tank and arranged to move the silage uphill along the upper half of the auger space during each filling operation and uphill along the lower half of the auger space during each emptying operation.

During the filling operation, the sweep unit functions as a spreader. At the beginning, this spreader is stationary (i.e., not rotated) but its augers rotate. The upper slanted longitudinal halves or radius sections of these augers cooperatively function to move the silage into and upwardly along the upper longitudinal half of the auger space causing a radially-extending ridge of silage (underneath the augers) to rise up toward the auger space. The augers progressively lengthen that radial ridge toward the tank wall. When the ridge reaches the vicinity of the tank wall, it contemporaneously reaches and operates a switch causing the rotary sweep unit to be energized and rotationally turned a few degrees whereupon the ridge-forming operation is repeated to form a second ridge which is angularly spaced from the first ridge. In this way, third, fourth and a substantial number of other ridges will be formed during the first half of the first revolution.

As the spreader/unloader approaches the end of the first half revolution, the low end of the slanted augers of the sweep unit correspondingly approaches the high end of the first ridge and this approach is used or "sensed" (by contact or otherwise) to actuate a "raising" switch. Now the spreader/unloader as a whole is raised to a level at which its low end (i.e., the low end of its augers) clears the high end of all of the ridges formed in the first half revolution. Again the sweep unit is fractionally turned and the first ridge-forming operation (of the second half of the first revolution) is performed. These operations are repeated cyclically until the low end of the augers closely approaches the high end of the first ridge formed at the beginning of the second half of the first complete revolution. Again the spreader/unloader is raised until the low end clears the high ends of the second half ridges. Thereafter, these ridge-forming and lifting operations are repeated through successive angles approaching or approximating 180° until the tank is filled to its top or to some desired lesser degree.

Another important object is achieved by providing a whirling chain-cutting hole former centered on the vertical axis of the tank. When rotated about and moved upwardly along that axis, it cuts a cylindrical discharge hole of uniform diameter entirely through the height of a silage column in the tank.

With the tank partially or entirely full and with the center discharge hole formed during or immediately following the filling operation, the first emptying or unloading operation can take place. During each unloading operation, the sweep unit and the augers rotate continuously. At first the augers remove feed only during that fraction of one complete revolution, which corresponds to the last cycle of the filling operation. Ultimately they remove feed continuously through each complete revolution of the unloader. As a consequence, silage is first discontinuously and later continuously moved uphill through the lower slanted half of the auger space until it reaches (and is discharged through) the center hole of the silage column. From time to time, the unloader is automatically lowered from one level to another in order to sink the augers once again into the silage and thus institute a silo-emptying operation on the next lower level. This is repeated at desired intervals until the silo is almost completely emptied whereupon the final residue may be best removed manually. During unloading, the whirling hole former may be shut down but, if desired, it may be rotated continuously or intermittently to fluff the discharge and keep the hole clear of obstruction.

BRIEF DESCRIPTION OF THE DRAWINGS

The invention is illustrated in the accompanying drawings wherein:

FIG. 4 is a partly broken side elevational view of the collector ring structure and the cutter chain drive structure;

FIGS. 5–7 are somewhat schematic side elevational views showing the spreader/unloader in a silo during various operations including the start of a filling operation in FIG. 5, the end of a filling operation or the beginning of an unloading operation in FIG. 6, and an intermediate point of an unloading operation in FIG. 7;

DESCRIPTION OF THE PREFERRED EMBODIMENT

Figure 1:
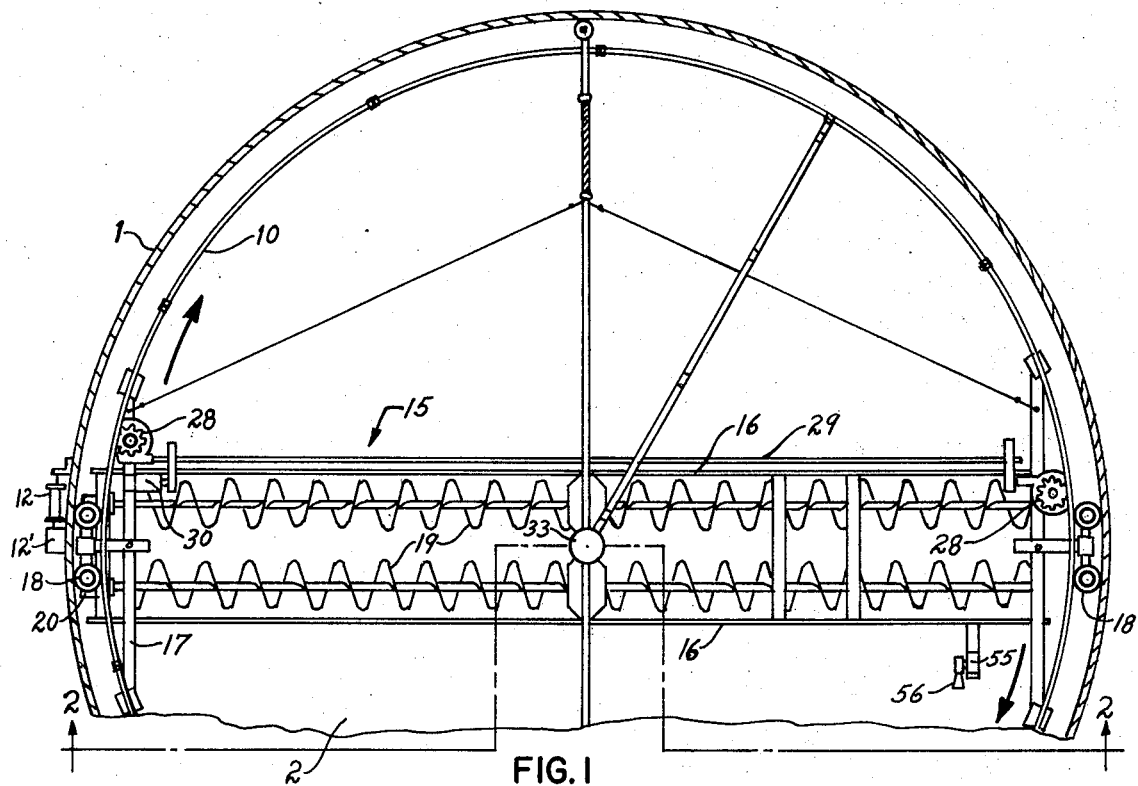
FIG. 1 is a top plan view of the preferred embodiment of my spreader/unloader as it appears in a cylindrical storage tank, the lower one-fourth of this view being omitted since it is substantially identical to the upper fourth.

The apparatus illustrated comprises: a cylindrical storage tank; and a spreader/unloader with a hole-former.

CYLINDRICAL STORAGE TANK

The cylindrical storage tank illustrated in the drawings comprises: an upright cylinder 1 having a flat bottom wall 2, a conical top wall or roof 3, a centrally disposed inlet opening 4 in its roof 3 and a centrally disposed outlet opening 5 in its bottom wall 2; a cylinder-supporting concrete base 6 having a center well 7 communicating upwardly with bottom outlet opening 5 of the tank and downwardly with a drag-line passageway 8 passing transversely half-way through the concrete base 6.

While my spreader/unloader may be used in tanks for storing various fibrous materials, for the sake of simplicity and clarity, it will hereinafter be referred to as a silo for sorting silage.

SPREADER/UNLOADER

Conventional Structure

The spreader/unloader illustrated is conventional to the extent that, broadly stated, it includes the following elements, viz: A. a ring gear means; B. a rotary sweep means; C. collector ring means; and D. hole-forming means.

Ring Gear Means

The ring gear means conventionally comprises a non-rotatable ring gear 10 suspended within a silo for lifting and lowering movement by means of a series of cables 11 connected to a motorized winch 12 on the outer face of the tank cylinder 1.

Rotarty Sweep Means

The rotary sweep means conventionally comprises: a rotary sweep unit 15 composed of a diametrically-elongate rectangular skeleton structural frame 16, including a cross frame member 17 at one end, wall-bumper wheels 18 at opposite ends of the frame for centering purposes, a pair of parallel twin right-and-left-hand augers 19 rotationally suported on the frame 16 at a level slightly below the frame, and a pair of auger-drive motors 20, one on each auger shaft; upright support means 24 at each end of the frame 16 for rotationally suspending the rotary sweep unit 15 from the lower flanged margin of the ring gear 10; and means for rotating the rotary sweep unit on the ring gear 10 including diametrically spaced sprockets 28 mounted on the frame 16 in position to engage tracking holes in the ring gear, a diametric drive shaft 29 geared to both sprockets and a sprocket-drive motor 30 connected to the drive shaft 29.

Collector Ring Means

The collector ring means 33, which is conventionally supported by a centrally disposed cable-suspended hanger 34, shown only in FIG. 4, conventionally comprises: an outer stationary structure; and an inner rotary structure.

The outer stationary structure comprises: an outer stationary hollow casing 35 having a centrally-disposed stationary hollow sleeve 36 depending downwardly from its bottom; a stationary brush holder 37 within the casing; and an electrical plug 38 through which incoming power can be connected to brushes on brush holder 37.

The inner rotary structure includes: an inner upright rotary collector ring structure 39 housed within casing 35; and a rotary "collector ring" shaft 40 integrated with the ring structure 39 and extending downwardly therefrom through the stationary sleeve 36 to project from the lower end thereof.

It will be understood that incoming power lines are connected through an electrical plug 38 to various electrical brushes on the stationary brush holder 37 and that the various rings on the inner rotary collector ring structure 39 are electrically connected through suitable electrical lines (not shown) to the various motors on the rotary sweep unit 15.

Hole-Forming Means

The hole-forming means may conventionally comprise a "drum,""cylinder" or "bullet" type of channel former, which is disclosed in the Hazen U.S. Pat. No. 3,075,657 granted Jan. 29, 1963 and which, in use, is positioned along the vertical axis of the ring gear and arranged for upward hole-forming movement during the filling operation. However, the hole-forming means illustrated features a multiple chain cutter which constitutes a later-described feature of my inventive structure.

Inventive Structure

The present invention provides: rotary sweep means featuring inclined diametric augers; hole-forming means featuring chain cutters; and novel means for controlling the operation of the equipment.

Inclined Diametric Augers

Figure 2:
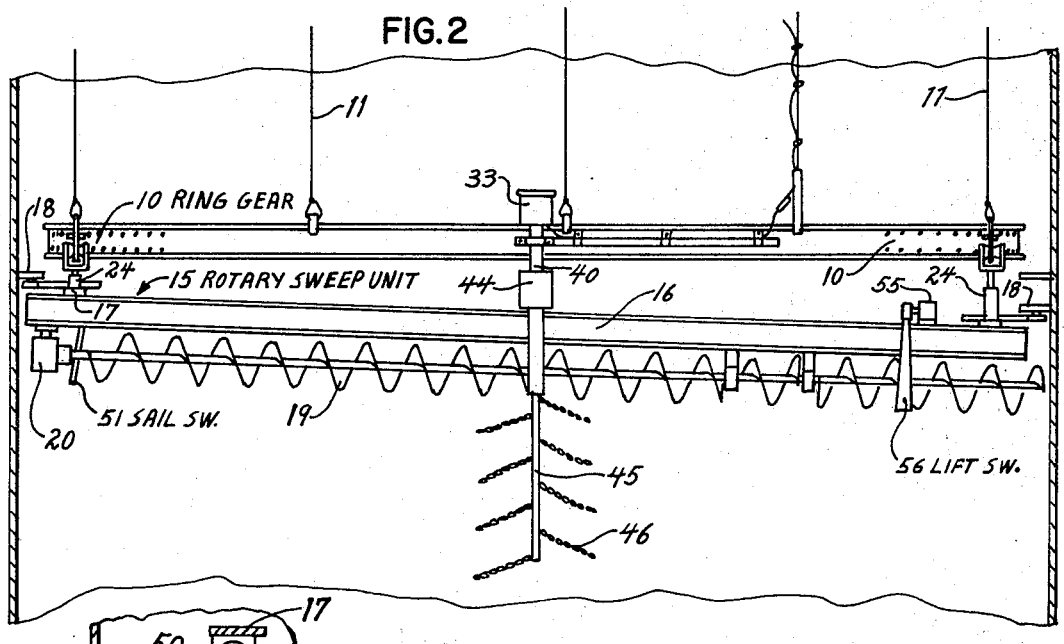
FIG. 2 is a broken side elevational view corresponding to one taken along line 2—2 of FIG. 1.
Figure 3:
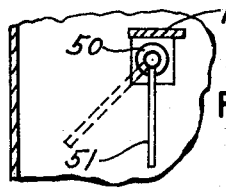
FIG. 3 is a fragmentary view showing how the rotation drive switch is mounted on the frame of the rotary sweep unit.
Figure 9A:
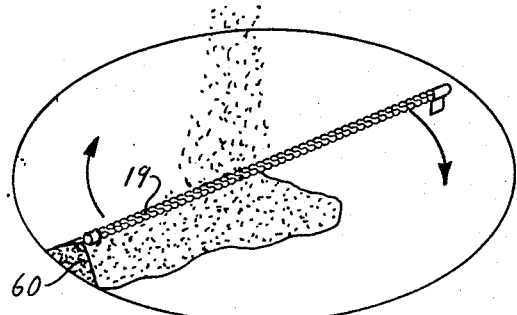
FIGS. 9A–D are somewhat schematic perspective views of a filling operation progressively showing, in FIG. 9A how the feed column appears at the end of the first ridge-forming operation in the first cycle, in FIG. 9B how that column appears at the end of the last ridge-forming operation of the first cycle, in FIG. 9C how it appears after the formation of the first two ridges of the second cycle of ridge-forming operations, and, in FIG. 9D how it appears at some intermediate point in the third cycle, all of these views omitting the center hole, FIG. 9C showing the top side of the individual ridges of the first cycle as if they formed a smooth level top surface instead of an undulating one and FIG. 9D showing the same form of top surface in all three cycles illustrated.
Figure 9B:
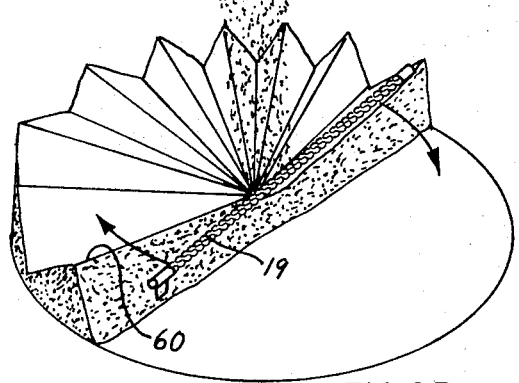
Figure 9C:
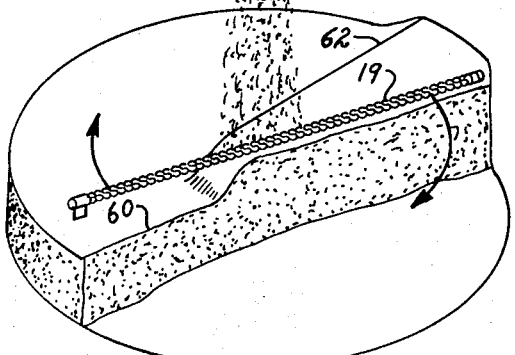
Figure 9D:
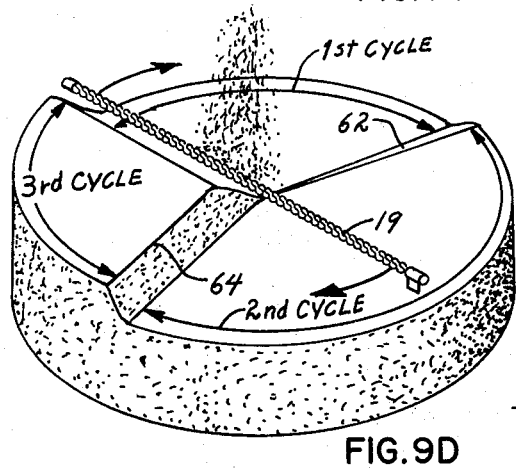

In accordance with a particular feature of my invention, the diametrically-extending right-and-left-hand augers 19 are inclined or slanted slightly relative to the ring gear 10. The desired degree of inclination is obtained simply by making one spaced pair of the depending support means 24 at one end (the right end in FIG. 2) of the rotary sweep unit 15 longer (preferably adjustably longer) than the other spaced pair of depending support means 24 at the opposite end of such unit. The inclination shown in FIG. 2 approximates 3.5° to the horizontal but the magnitude of the inclination is in the first instance a matter of the designer's choice. In use, it is a matter of the operator's choice and he can vary it accordingly as differing contents of the silo may dictate. While the inclination may be less than 3° or more than 5°, I presently prefer an inclination within the 3° to 5° range.

If desired, the augers 19 may be inclined relative to the frame 16 of the rotary sweep unit 15 with the frame 16 extending more or less parallel to the ring gear 10. But it is a simpler matter to incline the unit as a whole and keep the frame and augers parallel; hence, the inclined unit is preferred.

Hole-Forming Chain Cutter

The hole-forming chain cutter comprises: a drive motor housing 44 rigidly mounted on the lower end of the rotary collector ring shaft 40 to rotate therewith concentrically about the axis of shaft 40; a relatively rotatable motor shaft 45 projecting downwardly from motor housing 44; and a series of chain cutters 46 secured at spaced intervals along the length of shaft 45. The drive motor housing 44 will rotate at the slow speed of the rotary sweep unit while the chain-whirling motor shaft 45 will rotate at a much higher speed.

Each inclined diametric auger 19 may be viewed as having an unloading radius section extending radially inward on one side of said center axis from about one outer end of the diametric sweep unit to about the center axis and a spreading radius section extending radially outward on the opposite side of said center axis from about said center axis to about the opposite outer end of said diametric sweep unit.

Control Means

The control means includes: an auger control; a rotary sweep control; and a lifting control.

The auger control is nothing more than a conventional circuit for energizing the auger drive motors 20 at the outset of any filling or emptying operation; hence, we may assume that, when power is turned on for any of these operations, both auger drive motors 20 will be continuously energized and that the augers will be continuously rotated in one and the same direction relative to frame 16 on which they are mounted.

The rotary sweep control functions to start and stop the rotation of the rotary sweep unit 15 horizontally about the vertical axis of the silo. It includes a control unit in the form of a conventional sail switch 50, having a depending operating arm 51. The switch 50 is mounted on the underside of the cross frame member 17, at the high end of the frame 16, with its operating arm 51 depending into the high end of the auger space and holding switch 50 open. Here the arm 51 will ultimately be operatively engaged by the crest of the ridge-forming feed, moving uphill between the augers, when that crest closely approaches the outer wall of the silo and reaches a first predetermined elevational level. When operatively engaged, the depending arm 51 closes the "high end" switch 50 and causes the drive motor 30 (FIG.1) to rotate the rotary sweep unit horizontally about the center axis of the silo.

A few degrees of horizontal rotation is sufficient to disengage arm 51 from the feed and thereby open switch 50 to stop the rotary movement of the sweep unit. The continuously rotating augers 19 will now move the feed uphill toward the high end of the auger space and thereby progressively form a new ridge. The outer end of this new ridge will ultimately engage operating arm 51 and institute the next fractional rotary movement of the sweep unit. This type of action continues cyclically until the rotary sweep unit has rotated almost one-half of a revolution, say 160° to 170° or whatever is sufficient to bring the low end of the rotary sweep unit 15 into engagement with the high end of the first ridge formed during the first "half" revolution. My invention utilizes this low end engagement of the unit with the high end of the ridge to operate the lifting control.

As a lifting control means, I prefer a conventional sensing switch 55 mounted on the low end-portion of the frame with its downwardly depending operating arm 56 extending or spaced forwardly from the advancing side of the augers. When the sweep unit has rotated almost one-half of a revolution, the sensiing arm 56 of low-end switch 55 will engage the bank of the feed, at the high end of the initial ridge of feed, and, through such engagement, open switch 55 and thereby either energize a signal (not shown) to inform the operator that he must effect the raising manually, or energize the motorized winch 12 to raise the ring gear and the sweep unit with or without actuating a signal at the same time. When raised sufficiently to cause the operating arm 56 of the sensing switch 55 to clear the high ridge at the low end of the sweep unit, the operating arm 56 will become free to return to its inoperative position and thereby close switch 55, which deenergizes the winch motor 12. This motor will then remain deenergized until the next total of the incremental tracking rotation equals almost one-half of the next revolution.

OPERATION

Filling Operation

While the mechanical operation of the foregoing spreader/unloader should be clear, it may be desirable to explain the filing operation in terms of the electrical circuitry and the ridge-forming operations respectively shown in FIGS. 8 and 9A–D. For this purpose, the silo is assumed to be empty while the spreader/unloader is assumed to be located at a starting elevation such that its lowest cutter chain 46 extends vertically downward through the center hole 5 to an elevation in the center well 7 high enough to avoid contact with a dragline conveyor in passageway 8. An outside fill/empty or raise/lower switch 58 is closed to its "fill" or "raise" position.

The flow of silage into the silo is instituted. During an initial interval of time, the deposit in the silo builds up from the center of the floor and ultimately reaches the rotary sweep unit. At any time during that interval, the electrical system, controlling the filling operation, may be activated by moving the raise/lower switch 58 to its "raise" position and by connecting the electrical circuitry to power to energize circuit AA and its relay coil M-1 and thereby close both N/O line contacts M-1'. In this connection, N/O and N/C are used to designate "normally open" and "normally closed", respectively.

Upon the closure of line contacts M-1', the electrical system operates as follows: (1) it energizes the auger-circuit BB to activate the auger motors 20, which rotate the augers 19; (2) it energizes the chain-circuit CC to activate the cutter chain drive motor 44, which whirls the chains 46; (3) it leaves both the N/O rotary circuit DD of rotation drive motor 30 and its N/O high-end switch-circuit EFG dead because N/O high-end switch 50 is open; and (4) it tends to (but does not) energize the N/C (fast-opening slow-closing) bypass circuit EFH while simultaneously energizing both the N/C low-end inside and outside circuits JKL and JKM.

The N/C EFH bypass circuit is not energized because it is instantly opened by the JKL circuit. The N/C JKL circuit is instantly energized. When energized, its coil CR-1 opens the bypass contacts CR-1' in the N/C bypass-circuit EFH.

The outside JKM circuit cooperates with the filling-circuit NP to control the raising-circuit RS of the motorized winch 12 and with the emptying circuit NQ to control the lowering-circuit TS of the motorized winch 12. For example, with the raise-lower switch 58 closed in the filling-circuit NP, the energization of the JKM circuit and its coil CR-2 is instantly effective to open the filling-circuit NP at its N/C contact CR-2'. This prevents the filling-circuit coil M-3 from energizing the lifting-circuit RS of the motorized winch 12.

Accordingly, with the augers 19 rotating, the chains 46 whirling and the spreader/unloader remaining in one stationary position, the rotating augers on the slanted stationary rotary spreader/unloader are effective to move the feed from the low-end of the unloading radius secion uphill toward the high end ultimately creating a first ridge of feed 60 underneath the upper or spreading half of the augers. This first ridge increases in height from the center of the silo to the high end of the augers. When the feed reaches the high-end, it becomes effective to close the N/O high-end switch 50 and energize the high-end switch circuit EFG.

The energized high-end-switch circuit EFG activates its coil M-2 to close its N/O M-2' contacts in the rotary-circuit DD of motor 30 and thereby institute the rotation of the slanted spreader/unloader. This rotation continues through no more than say 10 to 20 degrees. It ceases when the high-end switch 50 disengages the feed and drops to its open position. The opening of high-end-switch 50 de-energizes the rotary circuit DD of rotary drive motor 30 stopping further rotation without interfering with the continued rotation of the augers and the cutter.

The apparatus repeats the foregoing cycle of sucessive ridge-forming and fractioal-rotation operations until the incoming feed is spread over an angle approximating 160° to 170° more or less. We assume that angle embraces nine individual ridges. At this point, the forwardly spaced arm 56 of the low-end fill-sensing switch 55 of the spreader/unloader engages a lower portion of the high-end of the very first feed ridge 60 and, through such engagement, opens said low-end sensing switch 55, which is in both of the inside and outside circuits JKL and JKM. This deenergizes coil CR-1 in the inside circuit JKL, which allows its fast opening contacts CR-1' in the high-end bypass-circuit EFH to begin a slow closing movement. It also de-energizes coil CR-2 in the outside circuit JKM which permits the N/O contacts CR-2' to reclose and thereby energize the filling-circuit NP and its coil M-3.

The energization of filling-circuit coil M-3 closes its switch contacts M-3'in the raising circuit RS of the winch motor 12' whereupon the winch performs a spreader/unloader lifting operation. This lifting operation proceeds until the low end of the spreader/unloader clears the top side of the very first feed ridge 60 and thus permits the low-end switch 55 to reclose and therby re-energize JK circuits L and M.

When the JK inside and outside circuits L and M are re-energized, the 1st ridge 62 of the second cycle of ridge-forming and fractional rotation operations is formed. This second cycle proceeds through successive ridge-forming operations until the incoming feed is spread over an additional angle approximating 160° to 170°. Again we assume that angle embraces nine individual ridges. At this point, the operating arm 56 of the low-end switch 55 of the spreader/unloader once again engages a lower portion of the high end of the first ridge 62 formed during the second cycle, i.e., the tenth ridge, and, through such engagement, institutes the next lifting operation followed by a third cycle of ridge-forming and fractional rotation operations embracing 9 more individual ridges beginning with ridge 64.

These cycles continue, in succession, until the filling operation is completed. At this time, tne lines L1-2 may now be disconnected from power leaving the top surface of the silage column in the silo in a condition such that the outer end of ridge 64 and the outer ends of all of the other eight ridges formed during the last half revolution are at one elevation (the highest) while the outer end of ridge 62 and the outer ends of all of the other eight ridges formed during the next to last half revolution are at a lower elevation.

Emptying or Unloading Operations

At the beginning of the silo emptying operation, the raise/lower switch 58 will be closed in its "lower" NQ circuit position. Also, at the beginning of the silo emptying operation, the feed removed will come mainly from the outer ends of the last-formed ridges because they are at the highest elevation. As the emptying operation proceeds, the outer end feed will be moved inwardly toward the center hole and the elevation of the outer ends of such ridges will be progressively reduced to the lower elevation of the outer ends of the ridges formed during the preceding cycle. Also, the underlying top surface area exposed by the feed which is removed, will increase inwardly toward the center hole. When this increasing area reaches the center hole, throughout its 360° extent, the top surface will then be convexly shaped with the lower half of the spreader/unloader in close engagement with the feed and the upper half diverging angularly upward away from the feed underlying it as seen in FIG. 7.

FIG. 6 shows the spreader/unloader as it appears at the beginning of the silo emptying operation. In the position shown, the low-end switch 55 hangs closed and the high-end switch 50 hangs open; hence, the rotary circuit is energized through the bypass-circuit EFH. As a result, the spreader/unloader is rotated and, through such rotation, the low-end switch 55 is ultimately opened through contact with the higher feed shown at the left of FIG. 6. This prevents either the raising or lowering of the spreader/unloader.

As the spreader/unloader rotates, its low unloading end removes feed initially from the higher level of feed at the left of FIG. 6. Removal from this level continues until the low-end switch loses contact with the feed and is thus permitted to swing closed. The closure of the low-end switch 55 operates through circuit JKM, emptying circuit NQ and lowering circuit TS to lower the spreader/unloader until contact is re-established between the feed and the low-end switch 55 to open the low-end switch and stop the lowering operation. Meanwhile, rotation continues and the unloading radius section operates to move feed uphill to the center hole. This type of operation continues until the level of the feed at the left of FIG. 6 is reduced to the highest level of feed at the right of FIG. 6. It continues thereafter until the top surface of the feed is convexly shaped as seen in FIG. 7. From this point on, feed is removed throughout the 360° traverse of the unloader.

The emptying operation will normally be repeated at intervals until the spreader/unloader reaches its starting elevation for the filling operation. At or about this point, the shaft 45, on which the chain cutters 46 are mounted, should be removed so that the unloading operations can thereafter continue until the low end of the spreader/unloader reaches the floor of the silo. When the spreader/unloader has removed all feed within its reach, it may be raised out of the way and the residue feed on the floor of the silo removed by shoveling, scraping or otherwise conveying it to the center hole 5.

MODIFICATION

FIG. 8

Figure 8:
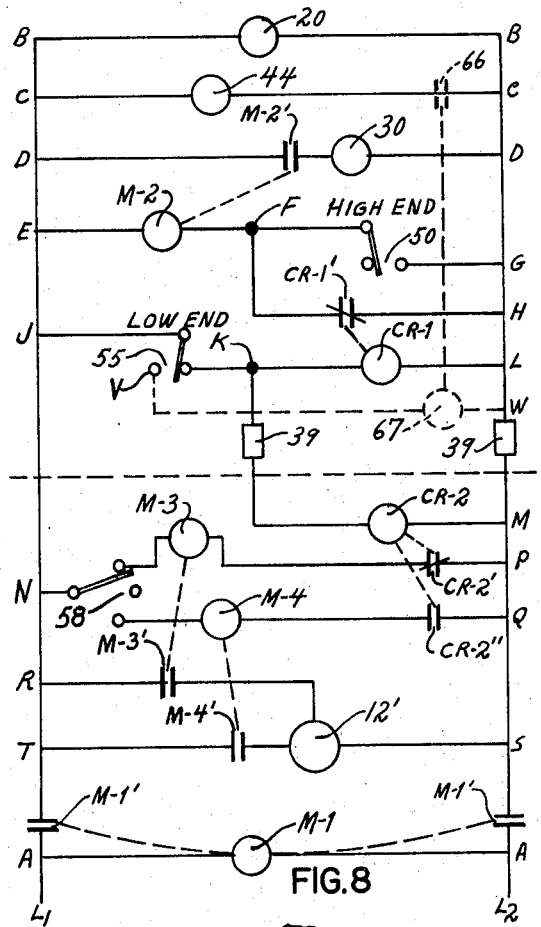
FIG. 8 is a diagram of the operating circuit for the foregoing spreader/unloader.

It may be desirable to operate the chain cutters only during raising and unloading and not during filling. This can be accomplished by providing a N/O switch 66 in the CC circuit and a coil 67 operative, when energized, to close that switch, this coil being arranged for energization by the low-end sensing switch 55 when that sensing switch is moved out of its normally-closed position. Such a coil circuit is indicated in FIG. 8 as the JVW circuit with the VW portion of the circuit shown in dotted lines.

FIG. 10

Figure 10:
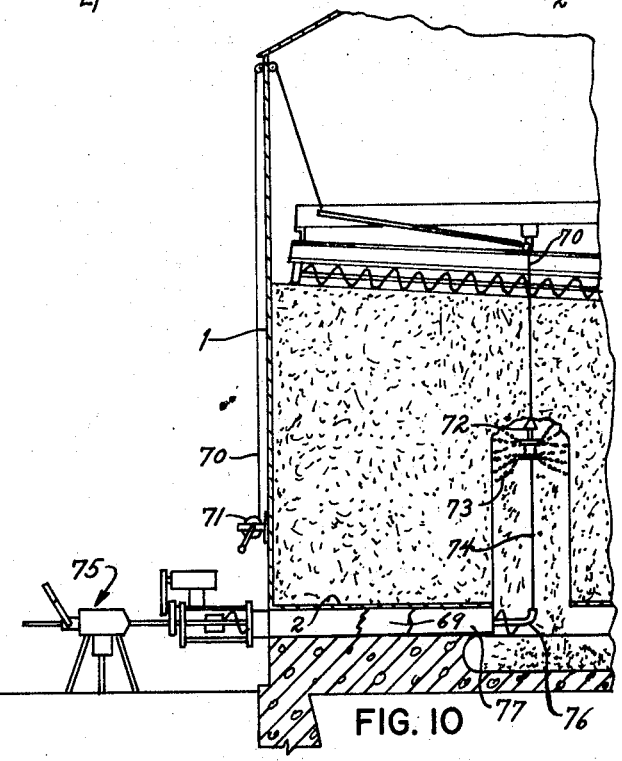
FIG. 10 is a broken somewhat schematic side elevational view showing the pertinent portion of a tank, my spreader/unloader and a modified form of a hole former.

The FIG. 10 modification may be used to form the center hole either during or after the filling operation. In this modification, it will be noted that the base 6 is provided with an auger-receiving passageway 69 and that a cable 70 depends from the center of the rotary sweep unit downwardly along the vertical axis of the silo. By means well known but not shown, the upper end portion of cable 70 is directed (and its outer end portion connected) to another outside winch 71 independent of motorized winch 12. The lower end portion of cable 70 is swively connected to the front end face of a rotary sewer-cleaning head 72 of the flail type having a number of flailing chains 73, preferably of equal length. The front end of a power-driven rotary cable 74 of a sewer cleaning apparatus 75 is trained through the center pipe 76 of auger 77 and then connected to the lower end face of head 72. As illustrated, the chains 73 of FIG. 10, like the chains 46 of the prior figures, have a length which is small in relation to the diameter of the ring gear so that, when rotated or whirled, they form, along the center axis, a cylindrical silage-discharge hole having a uniform diameter, which is small in relation to the diameter of the storage tank.

The foregoing apparatus is readied for the hole-forming operation by inserting the auger 77 into its proper position within base passageway 69 with the sewer-cleaning head 72 located adjacent the inner end of the auger pipe 76 and more or less centered on the silo's center axis. Now, when the cleaning apparatus 75 is energized, when its power-driven rotary cable 74 is forcibly fed forwardly and when the winch 71 is operated to pull the cable 70 upwardly, winch cable 70 and power-driven cable 74 cooperate to hold the head 72 to and maintain it more or less on the center axis of the silo while also moving that head upwardly through the feed column.

After the hole-forming operation is completed, the head 72 may be completely removed from the silo. If desired, the head 72 and the auger 77 may be retracted sufficiently to put the head 72 entirely within the passageway 69 and leave it remain there during the unloading operation so as to be available for unblocking the hole should it become blocked during the unloading operation.

Having described my invention, I claim:

1. A rotary sweep means for use in a cylindrical silage storage tank of the type having a horizontally-disposed non-rotatable vertically-movable ring gear, comprising:
  A. a rotary diametric sweep unit having
    1. a vertical center axis,
    2. a diametric sweep frame,
    3. diametric auger means including a diametric auger having
      a. an unloading radius section extending radially inward on one side of said center axis from about one outer end of said diametric sweep unit to about said center axis, and
      b. a spreading radius section extending radially outward on the opposite side of said center axis from about said center axis to about the opposite outer end of said diametric sweep unit, and
    4. integrating means mounting said diametric auger on said sweep frame to form said sweep unit; and
  B. means for mounting said sweep unit on the tank's ring gear for tracking rotation about the vertical axis of the gear,
    1. said sweep unit mounting means cooperating, with said integrating means, when said unit is mounted on said ring gear, to support said diametric auger with the outer end of its spreading radius section at an elevation higher than the outer end of its unloading radius section; and
  C. motorized means for rotating both of said radius sections about their respective long axes in one and the same direction during both spreading and unloading operations, said direction being such that
    1. the spreading section will move incoming silage outwardly on one side of center away from said center axis during a tank filling or loading operation when it is at least partly submerged in the silage, and
    1. the unloading section will move silage inwardly on the opposite side of center toward said center axis during a tank unloading operation when it is at least partly submerged in the silage.

2. The rotary sweep means of claim 1, including on the unit:
  A. tracking drive means operative, when energized, to rotate said unit on the ring gear; and B. a control element postioned at said one high outer end of said inclined diametric auger for engagement by auger-moved material, when that material reaches the high end during a filling operation, and operative, when so engaged, to actuate a tracking control means for energizing said tracking drive means.

3. The rotary sweep means of claim 2 including on the unit:
A. a control element positioned at the low outer end of said inclined diametric auger for engagement by the storage material after the tracking rotation of said unit approaches a more or less predetermined magnitude and operative, when so engaged, to actuate a control for effecting the vertical movement of said unit.

4. The rotary sweep means of claim 1 including:
A. a vertically elongate rotor mounted on said unit to extend along the center axis thereof;
B. a series of cutter chains having a length which is small in relation to the diameter of the ring gear and being secured at vertically spaced intervals along the length of said rotor; and
C. means for rotating said rotor to whirl said cutter chains for the purpose of forming along the center axis, a cylindrical silage-discharge hole of uniform diameter, which is small in relation to the diameter of the storage tank.

5. The rotary sweep means of claim 1 wherein:
A. said frame includes a pair of diametric side frame members;
B. said auger means include a pair of parellel diametric right hand and left hand augers;
C. said unit integrating means mounts said side frame members and augers in parallel relationship to each other; and
D. said mounting means is operative to support said unit in an inclined position relative to the ring gear.

6. A spreader/unloader for use in cylindrical storage tanks of the type intended to receive silage or other like fibrous material, comprising:
A. a non-rotatable ring gear mountable in a horizontal position within a storage tank for up and down movement over a range of elevated positions, said ring gear having a central vertical axis; and
B. the rotary sweep means of claim 1 rotationally mounted thereon with said diametric auger inclined thereto.

7. The rotary sweep means of claim 6 including:
A. tracking drive means operative, when actuated, to rotate the sweep unit on the ring gear; and
B. a control element positioned at said high outer end of said inclined diametric auger for engagement by auger moved material, when that material reaches the high end during a filling operation, and operative, when so engaged, to actuate a tracking control means for energizing said tracking drive means.

8. The spreader/unloader of claim 7 wherein:
A. said control element is further operative, when said sweep unit rotates sufficiently to effect its disengagement from said material, to de-actuate said tracking control means to de-energize said tracking drive means.

9. The spreader/unloader of claim 6 wherein:
A. said mounting means
1. mounts said sweep frame and diametric auger of said sweep unit to extend more or less parallel to each other, and
2. mounts the unit on the ring gear to extend at an inclined position relative thereto.

10. The spreader/unloader of claim 9 including:
A. a control element positioned at the low outer end of said inclined diametric auger for engagement by the storage material after the tracking rotation of said unit approaches a more or less predetermined magnitude and operative, when so engaged, to actuate a control means for vertically moving said spreader/unloader.

11. The spreader/unloader of claim 10 wherein:
A. said control element is further operative, when said spreader/unloader is lifted sufficiently to effect the disengagement of said control element from said material, to de-actuate said control means for vertically moving said spreader/unloader.

12. The spreader/unloader of claim 6 including:
A. a vertically elongate rotor mounted on said rotary sweep unit to extend along the center axis thereof;
B. a series of cutter chains secured at vertically spaced intervals along the length of said rotor, said chains
1. having a length which is small in relation to the diameter of the ring gear; and
C. means for rotating said rotor to whirl said cutter chains for the purpose of forming, along the center axis, a cylindrical silage-discharge hole of uniform diameter, which is small in relation to the diameter of the storage tank.

* * * * *